(No Model.)
J. W. PETERSON.
WAGON END GATE.
No. 531,747. Patented Jan. 1, 1895.
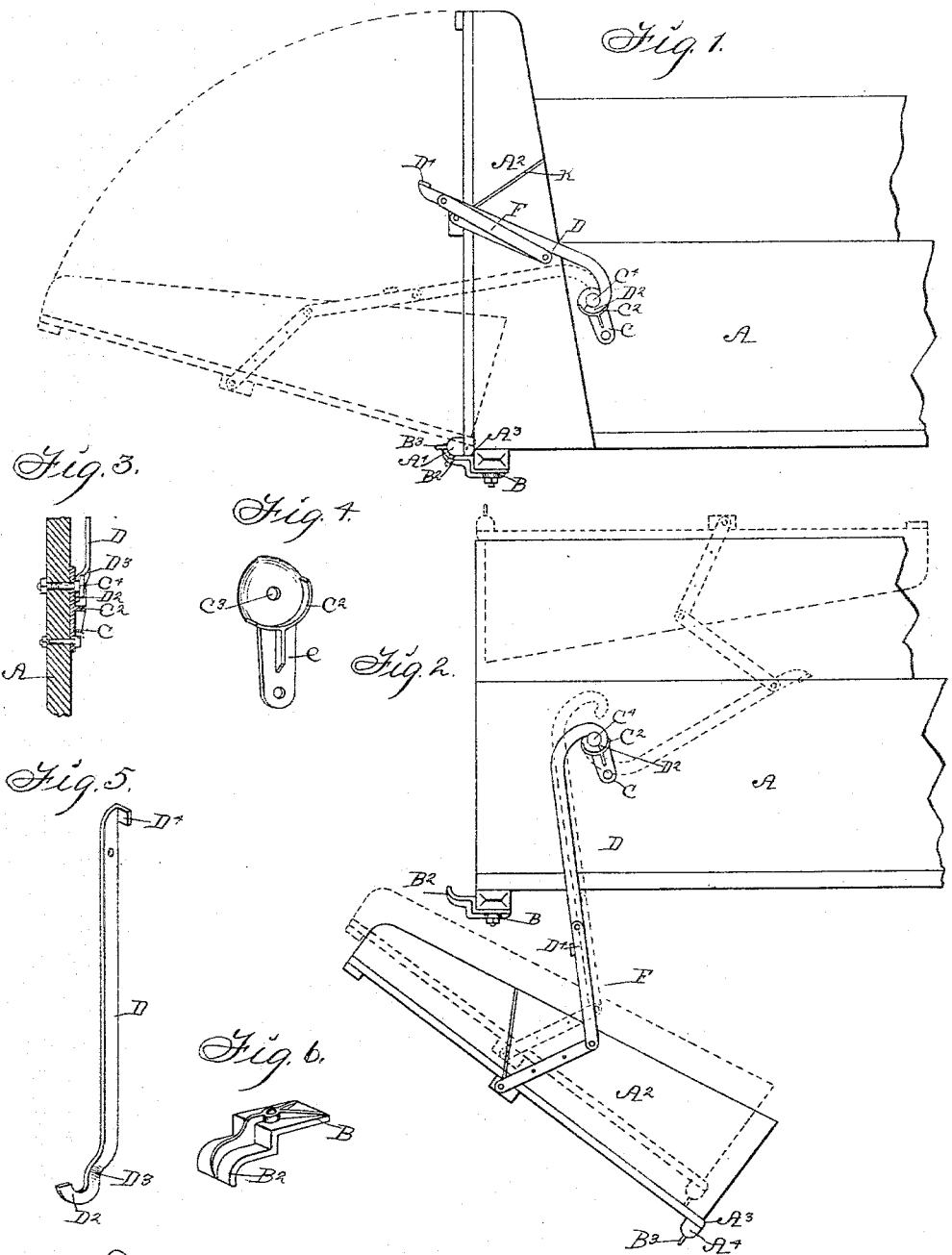

UNITED STATES PATENT OFFICE.

JOHN W. PETERSON, OF SLATER, IOWA.

WAGON END-GATE.

SPECIFICATION forming part of Letters Patent No. 531,747, dated January 1, 1895.

Application filed February 19, 1894. Serial No. 500,815. (No model.)

*To all whom it may concern:*

Be it known that I, JOHN W. PETERSON, a citizen of the United States of America, residing at Slater, in the county of Story and State of Iowa, have invented an Improved Wagon End-Gate, of which the following is a specification.

The objects of my invention are, first, to provide simple, strong, durable, and easily applied means for locking an end gate to a wagon box in a closed position and securely supporting the same in an approximately horizontal position for use as a shoveling board, or allowing it to be swung on top of the wagon box and be operated either from the wagon box or the ground surface, and to provide means whereby the end gate may be quickly and easily detached from the wagon box without removing any bolts, screws or the like.

A further object is, to provide means whereby the bottom edge of the end gate may be made to produce a tight connection with the bottom of the wagon bed, both when in a vertical and an approximately horizontal position and be prevented from sliding upwardly relative thereto when in other than a vertical position.

With these ends in view my invention consists in the construction, arrangement and combination of parts as hereinafter set forth, pointed out in my claims and illustrated in the accompanying drawings, in which—

Figure 1 is a side view of the end portion of a wagon box with the end gate locked thereto, and also shown supported in position for use as a shoveling board by dotted lines. Fig. 2 is a like view showing the end gate in position suspended below the wagon box and shown by dotted lines detached therefrom and also placed on top of the wagon box. Fig. 3 is an enlarged sectional view of one of the devices to which the end gate supporting arms are secured, attached to a portion of a wagon box and having one of said arms connected therewith. Figs. 4, 5 and 6 are enlarged, detail, perspective views of detached portions of the end gate supporting device, hereinafter more fully set forth.

Referring to the accompanying drawings the reference letter A is used to designate the wagon box and $A^2$ the end gate which is of common form save that its lower inner edge is slightly beveled at $A^3$ so that said edge will assume a position parallel with the edge of the wagon box when the end gate is supported in an approximately horizontal position and its lower cleat $A^4$ is rounded on its outer side for purposes hereinafter set forth.

B designates metal brackets adapted to be bolted to the bottom edge of the wagon box. It extends rearwardly therefrom and curves upwardly at $B^2$ to conform to the shape of the cleat $A^4$ and hold the lower edge of the end gate in close engagement with the wagon box at all times, and yet allow the end gate to be easily lifted out of engagement therewith.

$B^3$ designates staples driven in the cleat $A^4$ to admit the curved ends of the brackets B, and prevent the end gate from sliding upwardly relative to the wagon box except when in a vertical position or nearly so.

The end gate is supported by the following devices which are identical on both sides of the wagon, so that the parts on only one side will be described.

C designates a metal plate secured to the side of the wagon box and having a semi-circular flange $C^2$ formed on the forward and under portion of the center.

$C^3$ is an opening extended through its center and $C^4$ a headed bolt extended through said opening with its head some distance from the face of the plate as clearly shown in Fig. 3.

D designates an arm having a hook $D^2$ formed on its one end to partially encircle said bolt and engage the said semi-circular flange in such a manner that it may readily be withdrawn from engagement with said hook when hanging downwardly and be prevented from being withdrawn therefrom when in any other position. This arm D is bent outwardly at $D^3$ to allow it to clear the side of the wagon box and be in alignment with the outside face of the wings or sides of the end gate, and $D^4$ designates an integral lug extended at right angles to the arm from its top and outer end, when in a horizontal position.

F designates a link pivotally connected with the said arm and also with the wings or sides of the end gate, at such a position relative to the end gate that a line drawn through the bolt $C^4$ and the pivotal point of the link F on the end gate when the end gate is closed and locked to the wagon box, will pass above the end of the link that is attached to the arm D, or in other words, the link will pass a dead center to securely lock the end gate to the wagon bed.

When the end gate is placed in position for use as a shoveling board the edge of the link F will engage the integral lug $D^4$ and prevent the arms from sagging at their pivotal point, and allow them to fold upwardly but not downwardly.

In the practical operation of the device assuming that the device is in the position shown in Fig. 1, it will be seen that it may be placed in any other position either from the wagon bed or from the ground surface, and that the end gate may be detached from the brackets B only when in an approximately vertical position by reason of the staples $B^3$. The arms D may be detached from the bolt $C^3$ only when hanging downwardly on account of the semi-circular flange $C^2$, and further the arm D and the link F will be prevented from sagging downwardly by the integral lug $D^4$.

Having thus described the end gate and supporting device, what I claim as my invention, and desire to secure by Letters Patent of the United States therefor, is—

1. In combination with an end gate for wagons the following elements to wit; a rounded cleat secured to the rear under end portion of the end gate, brackets B secured to the bottom of a wagon bed and extended rearwardly therefrom to engage said rounded cleat as set forth and staples secured in said cleat to encircle the ends of said brackets and means for supporting the outer end of the end gate for use as a shoveling board, substantially as set forth for the purposes stated.

2. In a wagon end gate fastening device, the combination of the following elements, two devices adapted to be secured to the sides of a wagon box and comprising a metal plate having a perforation in its top, a semi-circular flange concentric with said perforation at its under side and a bolt having an enlarged head passed through said perforation with its head some distance from the plate, two arms adapted to support an end gate and having their outer ends flattened and curved in a semi-circular form adapted to partially encircle said bolts, and be prevented from moving outwardly therefrom by the heads thereof and from being detached from said plates when in other than a position depending downwardly therefrom, by said semi-circular flanges, substantially as and for the purposes stated.

3. An improved end gate fastening device, comprising two arms curved downwardly at their forward ends pivotally attached to the side of a wagon box and each having an outwardly projecting lug formed on its rear side at its lower end, two links pivotally attached to said arms at a slight distance above their ends and adapted to be attached to the side pieces of an end gate to support the end gate when in an approximately horizontal position and to fold upwardly but not downwardly when the end gate is being closed, so as to automatically lock itself when in a closed position, substantially as set forth.

4. An improved wagon end gate and fastening device therefor, comprising a suitable end gate having a rounded cleat secured to its rear under corner, two brackets adapted to be secured to the bottom of the wagon body, and project rearwardly and upwardly therefrom, two loops fixed to said rounded cleat to encircle the said brackets, two devices adapted to be fixed to the sides of a wagon bed and each having an opening in its upper end and a semi-circular flange concentric with said opening and beneath it, a headed bolt passed through the opening, two arms curved downwardly at their forward ends and each having a hook at its end adapted to enter between the bolt and semi-circular flange and capable of being detached therefrom only when said arms depend downwardly therefrom, a lug formed on the rear lower corner of each arm, and two links pivoted to said arms some distance from their ends and to the end gate, all arranged and combined substantially as and for the purposes stated.

JOHN W. PETERSON.

Witnesses:
W. P. VOLAND,
OLE L. OLLIPHANT.